April 7, 1964

C. K. HOWEY 3,127,790

ELECTRIC DRIVE

Filed April 20, 1960

Charles K. Howey,
INVENTOR
BY

Ernest F. Oberlin

AGENT

April 7, 1964

C. K. HOWEY
ELECTRIC DRIVE 3,127,790

Filed April 20, 1960

Charles K. Howey,
*INVENTOR.*
BY.

*Ernest F. Oberle*

AGENT.

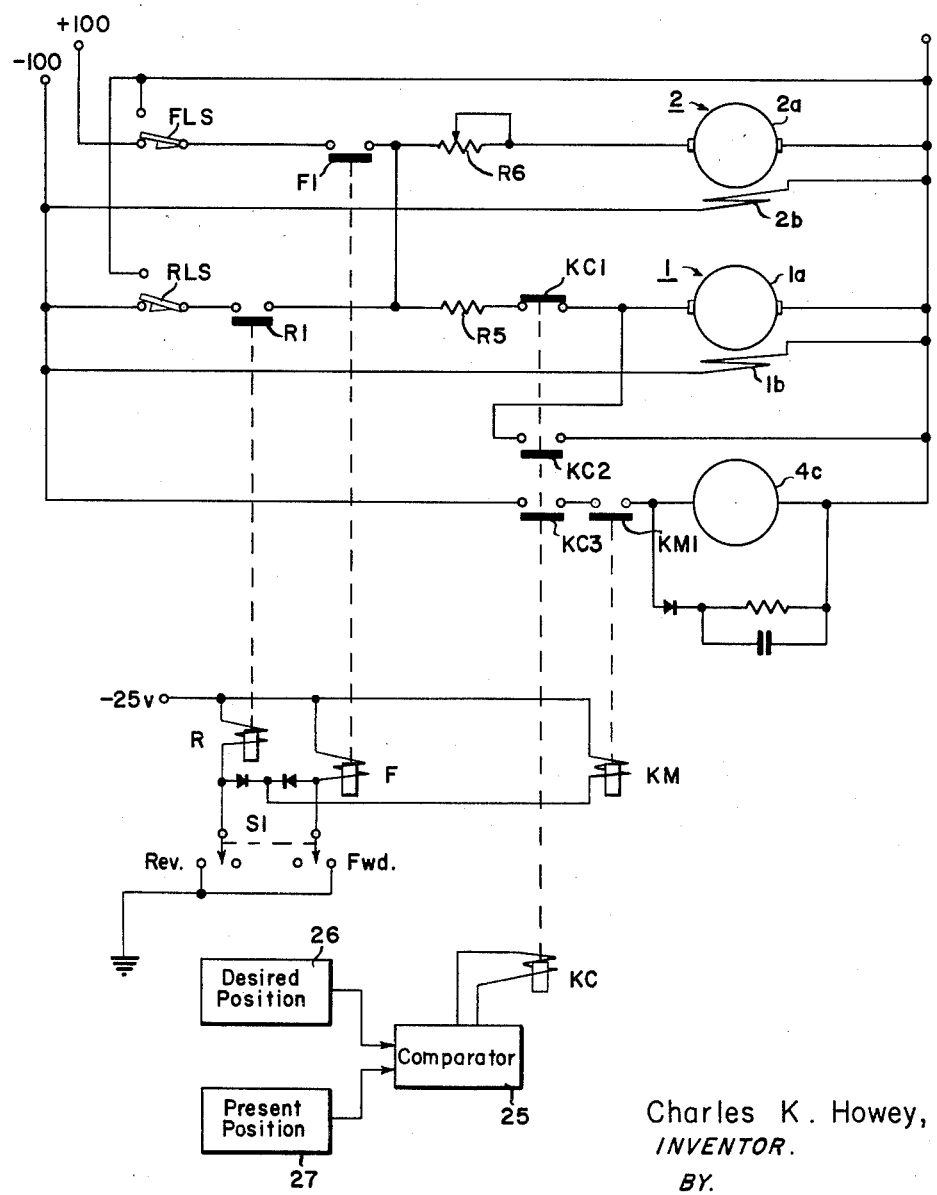

United States Patent Office

3,127,790
Patented Apr. 7, 1964

**3,127,790
ELECTRIC DRIVE**
Charles K. Howey, Torrance, Calif., assignor to Hughes Aircraft Company, Culver City, Calif., a corporation of Delaware
Filed Apr. 20, 1960, Ser. No. 23,568
4 Claims. (Cl. 74—661)

This invention relates generally to electric drives and more particularly to electric drives for positioning one member relative to another.

A general class of such control systems is frequently referred to as servos which are arranged to provide some character of mechanical output in response to a suitable input stimulus. Devices of this type are frequently found in automatic machine tool controls wherein the traverse and/or position of a workpiece support or of a tool require control.

In the application of servos to machine tools, or, more generally, to any arrangement requiring the positioning of one member relative to another, the questions of speed of movement and accuracy of positioning are material factors which must be considered in the design of the servo. The higher the operating speed of the servo when moving a member to be positioned between two points, the shorter may be the time required for positioning. At the same time, however, such high speed operation materially increases the problem of stopping the member to be positioned at a selected point with the degree of accuracy required.

Accordingly, one object of this invention is to provide an electric drive for moving and positioning one member relative to another, which is simple with respect to operational requirements and positive in operation.

Another object of this invention is to provide an electric drive for moving and positioning one element relative to another, which provides high speed operation in relatively positioning said members.

A further object of this invention is to provide an electric drive of the character referred to in the preceding objects, including provisions for rapidly decelerating the output member of said drive from some high speed to a lower speed in a minimum of time.

A specific object of this invention is to provide a two speed servo including facilities for rapidly decelerating the output of said servo from one speed level to a lower speed level.

Another specific object of this invention is to provide an electric drive which may be quickly stopped.

The aforesaid and other objects and advantages are accomplished in a control arrangement wherein an output shaft for powering a member to be driven is coupled to a main or a traverse motor which provides high speed operation of the output shaft. Low speed operation of the output shaft is provided by a creep motor. A clutch connects the creep motor with said output shaft when low speed operation is desired.

Under normal operation conditions, both the main or traverse motor and the slow speed or creep motor are energized. The clutch is disengaged. Thus, the main or traverse motor powers the output shaft. When it is desired, for instance, to stop the operation of the servo at some precise point, the main motor is braked and the clutch is substantially simultaneously engaged. The creep motor drives the clutch through a substantial gear reduction provided by an irreversible gear train connecting the creep motor with one member of the clutch. Hence, the output shaft in addition to being decelerated by the normal braking of the main or traverse motor is additionally decelerated by the braking action afforded by the creep motor drive at the time the clutch is engaged. By this expedient, extremely rapid deceleration of the output shaft is achieved by which a saving in time is provided which permits operation at rapid traverse speeds for a longer period of time before deceleration to creep speed is required, prior to stopping at a precise point.

Although power for the motors and for controlling the clutch may be manually switched, the advantages offered by the electric drive may be more fully realized if automatic switching is employed. The electric drive of this invention may form part of an analog or digital type of control system wherein signals are generated to provide indications of a desired direction of movement and wherein signals are generated indicating a desired position. In either instance, suitable transducer means are needed to indicate the actual or present position of the member being positioned. The signals provided by the transducer means may then be compared with the signals representing the desired position of the member, in suitable circuits, which may be referred to as comparator circuits, and, the result of the comparison utilized as a signal controlling the electrical circuits providing power for the two motors and the clutch.

In such a situation, anticipation of the final position may be achieved in the provision of anticipation distance signal. This may be a separately generated signal or in the case of a digital control system may be simply a scale count which is built into the system which, when achieved, will automatically switch the system into its creep mode of operation prior to stopping at the final position.

Arrangements of this type may take on a variety of forms and the applicability of the motor drive, per se, herein described, to either analog or digital types of controls will be appreciated.

Other objects and advantages will become apparent from a study of the following specification when considered in conjunction with the accompanying drawings in which:

FIG. 3 is an electrical circuit for controlling the electric drive illustrated in FIGS. 1 and 2.

Figure 1:
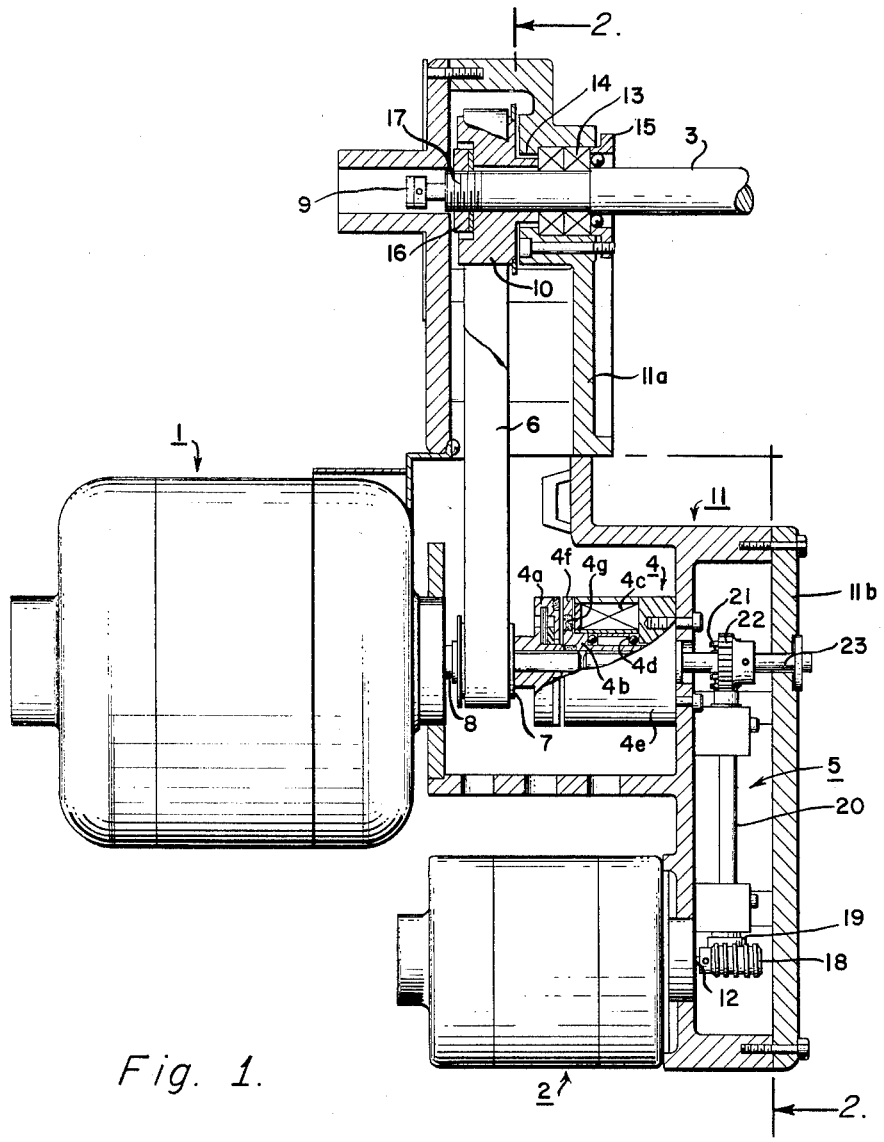
FIG. 1 is a sectional view of electric drive embodying the principles of this invention.
Figure 2:
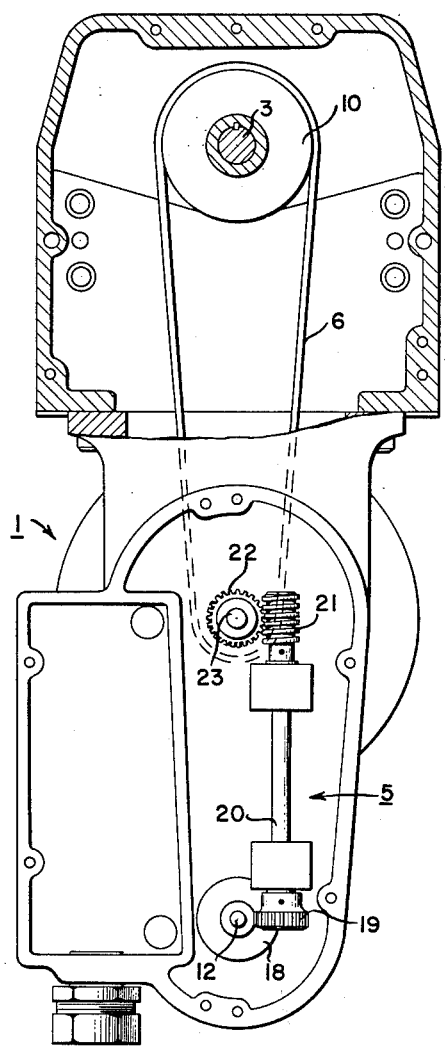
FIG. 2 is an end view fragmentarily in section of the electric drive illustrated in FIG. 1.

The mechanical details of the electric drive are illustrated in FIGS. 1 and 2 which illustrate the motor drive. The motor drive comprises a main, or, traverse, motor generally designated 1 and an auxiliary, or, creep, motor generally designated 2. Both of these motors are arranged to be connected with an output power shaft generally designated 3. A clutch, 4, which is normally disengaged, is utilized to connect the creep motor 2 with the power output shaft 3 when the system is switched to the creep mode of operation. The clutch comprises an output member 4a and input member 4b. The input member 4b is driven by the creep motor 2 through a reduction gear drive generally designated 5 providing a speed reduction to a suitable creep speed for driving the power shaft 3. The connection with the power shaft 3 is accomplished by a toothed belt generally designated 6 which couples a power pulley 7 on motor shaft 8 of the main or traverse motor 1 and an output pulley 10 which is keyed to the power shaft 3. The details of this assembly will be apparent from the following description.

In a particular control arrangement, for instance, for a machine tool, it is desired to control positioning of a machine tool member from one point to a second point in a minimum of time. In the arrangement referred to, the power shaft 3 may represent a lead screw for driving a machine slide, for instance, between its extremes of movement, or, between selected positions within said extremes. In this particular arrangement, the traverse motor 1, see FIG. 3, is a direct current motor provided with an armature winding 1a and a field winding 1b. With a motor of this type, speed control is conventionally achieved by control of the voltage applied to the armature winding of the motor. In this particular instance, it will be observed that the voltage applied to the armature winding is fixed, which affords motor operation at some selected speed which is suitable for rapid traverse operation. Any suitable arrangement may be provided for selecting the necessary voltage for achieving a desired motor speed. In this instance, a resistor R5 in series with the armature circuit of the main motor 1 is employed to calibrate the armature circuit. The field winding 1b is energized by a fixed voltage. The power supply for the system is represented by the circuits marked +100 volts and −100 volts for achieving forward and reverse operation of the two motors and selective switching yet to be described. The creep motor 2 may also be a direct current motor including an armature winding 2a and a separately excited field winding 2b. The creep motor armature winding also may be selectively energized by voltage of one polarity or the reverse, to achieve operation in one direction or the reverse in correspondence with the operation of the main motor 1. The speed of the auxiliary or creep motor 2 may be selected by means of a series calibrating resistor R6 in the armature circuit to obtain the desired creep speed.

The motors 1 and 2 are mounted in a suitable housing generally designated 11 which includes an upper housing section 11a and a lower motor housing section 11b. Both motors 1 and 2 are securely fitted in the lower motor housing section 11b and their output shafts 8 and 12, respectively, protrude into this housing. The upper housing section 11a journals the power output shaft 3 in a suitable bearing assembly 13 which is clamped between a housing flange 14 and a retaining collar 15. Toothed pulley 10 is keyed to the power shaft 3 and secured thereto by means of a nut 16 which threads over the end 17 of the power shaft 3. A clutch member 18 provided on the end 17 of the power shaft 3 may be utilzed to provide input to a suitable transducer assembly, not shown, which may be used to count shaft revolutions and increments of shaft revolutions for the purpose of indicating the linear, or, angular, position of a member, not shown, being positined by the power output shaft 3.

The output member 4a of the clutch 4 is keyed to the motor shaft 8. A coil 4c controls the operation of the clutch from disengaged to engaged positions. The input member 4b is keyed to a shaft 23, forming part of the creep motor drive, and is journaled in bearings 4d to rotate in clutch housing 4e. Output member 4b includes a clutch ring 4f mounted on a flexible annulus 4g on input member 4b. When coil 4c is energized, ring 4f engages output member 4a engaging the input member to the output member. The input member 4b of the clutch, as previously generally described, is driven by the creep motor 2 through the reduction drive 5. The drive herein illustrated includes a worm 18 mounted on the creep motor shaft 12 meshing with a worm wheel 19 on a connecting shaft 20. Shaft 20 at its upper end, as seen in FIG. 2, mounts a worm 21 in turn meshing with a worm wheel 22 connected to a shaft 23 which is the input shaft to the clutch 4 and drives the driven member 4b of the clutch.

With the arrangement described it will be seen that at any time that the clutch 4 is energized and engaged, the creep motor 2, in addition to driving the power output shaft 3 through the toothed belt drive provided, also drives the main or traverse motor 1.

The circuit arrangement for controlling the motor drive is illustrated diagrammatically in FIG. 3. Here voltages of opposite polarity represented in conductors designated +100 and −100 are selectively applied as input to the armature windings of the main and creep motors 1 and 2, respectively, to achieve operation in either forward or reverse directions. Alternatively, suitable switches electrically reversing the armature with respect to the field with a single voltage supply circuit, may be employed. The direction of rotation of the motors is controlled by a pair of relays, respectively designated F and R, the coils of which are selectively energized by a switch arrangement, here represented as a manually operated switch S1, which selectively energizes the forward relay F or the reverse relay R in each of its indicated forward or reverse positions. The contacts F1 and R1 of the relays F and R, respectively, are connected in series in the armature circuit for both of the motors. Hence, by closing either of these normally open contacts, the motors may be simultaneously operated in either the forward or reverse direction.

For either direction of movement, interruption of motor operation in its physical limits may be achieved by means of limit switches FLS and RLS, respectively. Additionally, while not shown, automatic stopping in any particular position may be achieved by means of additional switches connected in series in the motor armature circuits in order to de-energize the circuits, or, may be accomplished by connections in the circuits for the coils of the respective relays F and R to de-energize the energized relay whenever a desired position is achieved.

As earlier mentioned, control of the motors to reduce the speed from the high or traverse speed to the low or creep speed is accomplished by braking the main motor 1 while substantially simultaneously energizing the clutch 4 to connect the creep motor 2 to the output shaft. In the circuit illusrated, this is accomplished by means of a relay generally designated KC. This relay may be controlled by the output of a comparator circuit 25 in turn receiving signals from a desired position control 26 and from a present position control 27. Circuits of this general character are described in some detail in a copending application of T. T. Kumagai et al. entitled "Machine Tool," Serial No. 827,981, and assigned to the assignee of this invention. In such an arrangement instructions read from a tape, for instance, a perforated paper tape, constitute the desired position. Scale counters associated with the machine slides or with a lead screw powering the slides, as considered herein, provide signal information indicative of the present position of the tool. The signals provided by these two circuits are compared in the comparator 25 which produces no electrical output as long as the anticipation difference has not been reached. Such being the case, relay KC is de-energized and the contacts KC1, in series in the armature circuit of the motor 1, are closed. Thus, assuming, for instance, that the forward relay F is energized, the contacts F1 will be closed. Assuming further that the movable member is between its mechanical limits, both limit switches FLS and RLS will be closed. Limit switch FLS being closed, completes an energizing circuit from the +100 conductor for the armatures of both of the motors 1 and 2 which now operate in the forward direction. As the device or member being positioned approaches the desired position, the anticipation distance is reached. At this point, the electrical output of the comparator system 25 energizes the relay KC. Contacts KC1 now open, de-energizing the armature winding of the main motor 1. Contacts KC2 complete a circuit shunting the armature winding of the main motor 1. The motor now functions as a generator absorbing the load which is now trying to drive the motor and acts as a dynamic brake tending to rapidly reduce the speed of the load. At the same time contacts KC3 energize the coil 4C of the clutch 4 which, as previously described, connects the creep motor directly to the drive for the output shaft 3. In this instance, it will be recalled the connection is directly to the motor shaft 8 of the main motor which accomplishes the same purpose. The clutch after engagement, while slightly slipping, acts as a brake, slowing down the main motor and the output shaft 3. The combined action of the dynamic braking of the main motor and the mechanical braking of the drive for the shaft 3 very rapidly reduces the speed of the output shaft 3 to creep speed. The combined action being such and the time saving being such that normally the system may be operated in its rapid traverse mode of operation for a longer period of time before initiation of braking takes place than with more conventional arrangements. In particular, for instance, in a numerical system or in an analog system, the anticipation distance of the final position may be materially shortened. Stopping is accomplished by de-energizing and disengaging clutch 4. Relay KM which is energized in either position of switch S1, deenergizes the clutch coil when the directional relays are deenergized to stop the system. The creep motor need not be deenergized and stopped. Hence, stopping time is only a few milliseconds and stopping distance from creep speed, minimal.

Numerous circuit details have been eliminated from the diagrammatic showing of FIG. 3. Normally, a circuit of this type will include overload protective devices and will include circuits for controlling the application of energy to the power supply conductors. Additionally, there may be arrangements included affording a more sophisticated approach to the control concept than that which is herein illustrated, the arrangement herein shown being concerned primarily with that of conveying the control concept affording the two speed type of operation.

What is claimed is:

1. An electric drive, comprising: an output shaft; a first motor; means connecting said motor to said output shaft to drive said output shaft; a second motor; means including a normally disengaged, electrically operated clutch coupling said second motor to said output shaft; a first motor energizing circuit connected to said first motor and a second motor energizing circuit connected to said second motor for energizing said motors in a sense to drive said output shaft in one direction; a normally inoperative motor braking circuit coupled to said first motor; a clutch control circuit coupled to said clutch; and control means coupled to said first motor energizing circuit, to said motor braking circuit and to said clutch control circuit to disconnect said first motor energizing circuit from said first motor, to operate said motor braking circuit and to operate said clutch control circuit to engage said clutch.

2. A two motor drive system comprising: a first motor having an output shaft; a second motor having an output shaft; a substantially irreversible speed reducer having an input shaft connected to said output shaft of said second motor and having a low speed output shaft which operates at a speed below the operating speed of said output shaft of said first motor; a friction clutch having a pair of normally disengaged, relatively movable, friction clutch members; means connecting one clutch member to said output shaft of said first motor to rotate therewith; means connecting the other clutch member to said low speed output shaft of said speed reducer; electromagnetic means forming a part of said clutch for relatively moving said clutch members into frictional engagement to connect said output shaft of said first motor to said low speed output shaft of said speed reducer; a first motor energizing circuit connected to said first motor; a second motor energizing circuit connected to said second motor; and control means coupled to said first motor energizing circuit and to said electromagnetic means to disconnect said first motor energizing circuit from said first motor and to energize said electromagnetic means.

3. An electric drive, comprising: a main motor having a main motor shaft; an auxiliary motor having an auxiliary motor shaft; a main motor energizing circuit connected to said main motor; an energizing circuit connected to said auxiliary motor; a speed reducer having an input shaft coupled to said auxiliary motor shaft and having an output shaft; means including only one clutch operable between engaged and disengaged conditions and being normally disengaged, coupling said output shaft of said speed reducer to said main motor shaft; clutch actuating means coupled to said clutch for operating said clutch between engaged and disengaged conditions; and control means coupled to said main motor energizing circuit and said clutch actuating means to disconnect said main motor energizing circuit from said main motor and to control said clutch actuating means to operate said clutch to engaged condition.

4. An electric drive, comprising: a main direct current drive motor having a motor shaft, an armature winding and field means producing a substantially constant field; an auxiliary motor having a motor shaft; energizing circuit means connected to said auxiliary motor; a substantially irreversible drive having an input shaft coupled to said motor shaft of said auxiliary motor to be driven thereby and having a low speed output shaft operable at a speed below the speed of operation of said motor shaft of said main motor; means including only one clutch operable between engaged and disengaged conditions and being normally disengaged, coupling said low speed shaft to said motor shaft of said main motor; clutch actuating means coupled to said clutch for operating said clutch between engaged and disengaged conditions; an armature winding energizing circuit connected to said armature winding; a normally open shunting circuit connected to said armature winding; and control means coupled to said armature winding energizing circuit, said shunting circuit and said clutch actuating means to disconnect said armature winding circuit from said armature winding, to close said shunting circuit and to substantially simultaneously control said clutch actuating means to operate said clutch to engaged condition.

References Cited in the file of this patent

UNITED STATES PATENTS

| | | |
|---|---|---|
| 2,281,569 | Fritsche | May 5, 1942 |
| 2,920,729 | Breuer | Jan. 20, 1960 |
| 2,923,172 | Lewis | Feb. 2, 1960 |
| 2,942,564 | Larys et al. | June 28, 1960 |